United States Patent [19]

Yamada et al.

[11] Patent Number: 5,178,817
[45] Date of Patent: Jan. 12, 1993

[54] STRETCH BLOW MOLDING METHOD FOR MANUFACTURING AN EXPANDED BOTTLE

[75] Inventors: Tsutoo Yamada, Nerima; Takemi Shibuya, Higashiyamato, both of Japan

[73] Assignee: Dai Nippon Insatsu K. K., Tokyo, Japan

[21] Appl. No.: 751,668

[22] Filed: Aug. 23, 1991

Related U.S. Application Data

[63] Continuation of Ser. No. 403,432, Sep. 6, 1989, abandoned.

[30] Foreign Application Priority Data

| Sep. 6, 1988 | [JP] | Japan | 63-223301 |
| Oct. 4, 1988 | [JP] | Japan | 63-250612 |
| Oct. 7, 1988 | [JP] | Japan | 63-253405 |

[51] Int. Cl.⁵ ............................................. B29C 49/12
[52] U.S. Cl. ............................................. 264/532; 264/295; 264/523; 264/531; 425/525; 425/528; 425/529
[58] Field of Search ............ 264/532, 531, 295, 339, 264/534, 523, 535; 425/529, 392, 525, 528

[56] References Cited

U.S. PATENT DOCUMENTS

| D. 182,683 | 4/1958 | Nowak | 215/1 C X |
| 1,877,629 | 9/1932 | Replogle | 264/339 |
| 2,920,777 | 1/1960 | Cole | 215/31 X |
| 3,470,282 | 9/1969 | Scalora | 425/529 |
| 3,490,501 | 1/1970 | Manem | 215/1 C X |
| 3,608,017 | 9/1971 | Cines | 215/1 C X |
| 3,744,656 | 7/1973 | Scheemann et al. | 215/31 |
| 4,572,412 | 2/1986 | Brach et al. | 215/1 C X |
| 4,770,854 | 9/1988 | Lyman | 215/31 X |
| 4,832,213 | 5/1989 | Sharon et al. | 215/1 C X |

FOREIGN PATENT DOCUMENTS

| 1226864 | 8/1960 | France | 220/94 A |
| 1441768 | 3/1966 | France | 264/531 |
| 1491989 | 4/1967 | France | 264/295 |
| 49-8937 | 3/1974 | Japan | 264/535 |
| 56-150763 | 11/1981 | Japan . | |
| 62-29375 | 7/1987 | Japan . | |
| 62-29376 | 7/1987 | Japan . | |

*Primary Examiner*—Jan H. Silbaugh
*Assistant Examiner*—Catherine Timm
*Attorney, Agent, or Firm*—Sughrue, Mion, Zinn, Macpeak & Seas

[57] ABSTRACT

A stretched bottle (1) has an inclined mouth portion (31). The bottle (1) is formed in a manner that a straight parison is set in a blow mold ($M_1$, $M_2$) having an inclined cavity (20, 404) to be stretched by a stretching rod (17) during an air-blow operation or that a curved parison (405, 512) is set in the blow mold ($M_1$, $M_2$) to be stretched by air-blow. The parison is curved or deformed by a defining mold (431, 711) or a pushing bar (514).

12 Claims, 18 Drawing Sheets

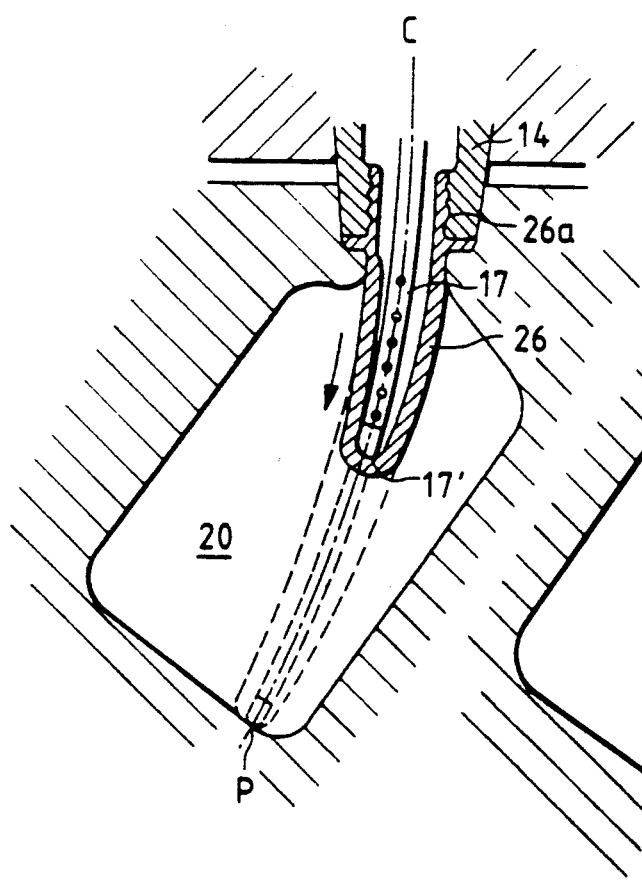
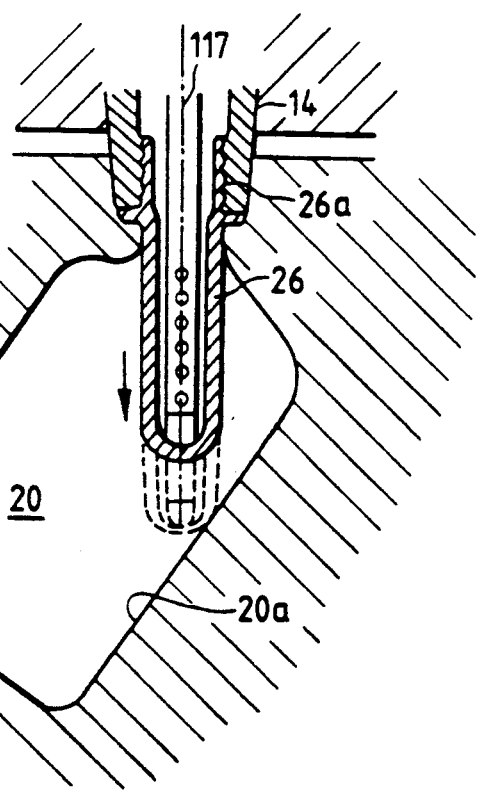
FIG. 4
FIG. 5

FIG. 34(a)  FIG. 34(b)
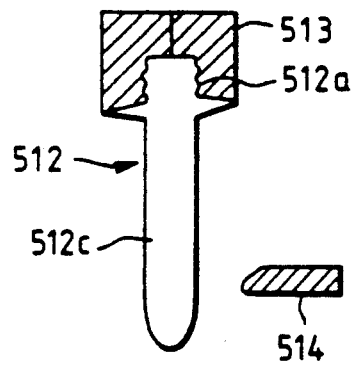 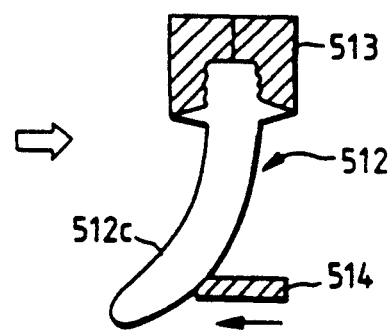
FIG. 35(a)  FIG. 35(b)  FIG. 35(c)
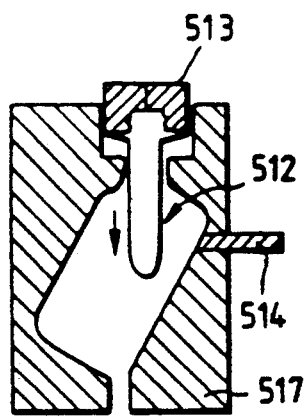 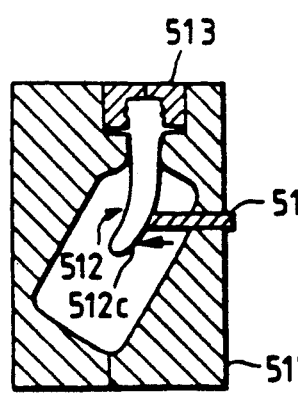 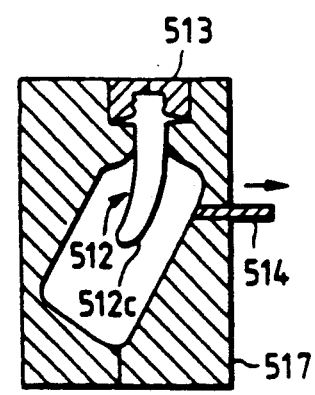

STRETCH BLOW MOLDING METHOD FOR MANUFACTURING AN EXPANDED BOTTLE

This is a continuation of application Ser. No. 07/403,432 filed Sep. 6, 1989 now abandoned.

BACKGROUND OF THE INVENTION

This invention relates to a blow molded bottle having an inclined mouth, a parison for the bottle, a combined container including the bottle in an outer box, a method of and an apparatus for producing the bottle and the parison for the bottle and a mold for working the method.

A bottle made of thermoplastic resin such as polyester or the like is widely used for a container for drinks or beverages. The bottle has generally a mouth portion coaxial with its body portion.

Such a bottle is disclosed in Japanese Utility Model Laid-Open Publication 56-150763 and Japanese Utility Model Publications 62-29375 and 62-29376. Each of these conventional bottles has a mouth portion coaxial with a main body subjected to a biaxial stretching operation, and the mouth portion has bellows or a transformable portion for inclining the mouth portion.

However, the mouth portion can be inclined by the provision of the transforming means such as bellows, and, therefore, there exists extra recessed and projected portions at the mouth portion or the body portion thereof. Contents of the bottle are apt to be left in the transforming means, and a smooth flow of the contents is obstructed. Further, the surface area of the bottle is increased, and a gas barrier property or the like is lost. In addition, since the complicated transforming portion such as the bellows must be provided, the cost for manufacturing the bottles is increased.

In a portable bottle such as a whisky bottle, a bottle having a flat or book-like shape is desirable in view of fashion, and people want a portable bottle having an inclined mouth portion in view of its handling. However, it is difficult to manufacture a flat bottle having an inclined mouth portion by a conventional biaxial orientation blow or stretching molding. That is, in the conventional blow molding for stretching a parison in the longitudinal direction, the parison is not stretched in an even manner thereby to cause some corner portions whose wall thicknesses are remarkably thin. Therefore, a good bottle having a high quality cannot be obtained.

SUMMARY OF THE INVENTION

It is an object to provide a stretched blow forming bottle, a parison for the bottle, a combined container including the bottle therein, an apparatus for and a method of producing the bottle and the parison, and a mold for producing the bottle and the parison in which a bottle having a high quality and an inclined mouth can be obtained.

According to one aspect of this invention, there is provided a stretched blow molded bottle having a flat rectangular body portion and a cylindrical mouth portion, characterized in that the cylindrical mouth portion is inclined with respect to the body portion.

According to another aspect of this invention, there is provided a combined container including a flat and rectangular outer box and a stretched blow molded bottle accommodated in the outer box with its mouth portion projected from an upper surface of the outer box, characterized in that the outer box has an inclined surface at its upper surface, and the bottle has an inclined mouth portion which projects outwardly from the inclined surface of the outer box.

According to still another aspect of this invention, there is provided a blow mold for manufacturing a stretched blow molded bottle, which has a lip mold for holding a mouth portion of a parison and a pair of blow half molds joined with each other at its parting plane, characterized in that a cavity formed by the blow half molds is inclined with respect to the lip mold.

According to still another aspect of this invention, there is provided a parison for blow molding, which has a cylindrical mouth portion and a cylindrical body portion, characterized in that the cylindrical body portion of the parison is curved.

According to still another aspect of this invention, there is provided a parison deforming mold for curving or deforming a body portion of a parison, characterized in that the mold has a curved surface for slidably contacting a peripheral surface of a body portion of the parison, a heating means being disposed along the curved surface. According to still another aspect of this invention, there is provided a stretching blow molding method for manufacturing a stretched bottle in which a parison is set in a blow mold to be stretched by air-blow, characterized in that the method comprises steps of: setting a straight parison in a cavity disposed inclinedly relative to a lip mold for holding the parison; and supplying compressed air into the parison while the parison is stretched by a curved stretching rod.

According to still another aspect of this invention, there is provided a stretch blow molding method for manufacturing a stretched bottle in which a parison is set in a blow mold to be stretched by air-blow, characterized in that the method comprises steps of: setting a straight parison in a cavity disposed inclinedly relative to a lip mold; curving a body portion of the parison by a parison deforming means in the cavity so that its bottom is directed to a bottom of the inclined cavity; and supplying compressed air into the deformed parison.

According to still another aspect of this invention, there is provided a stretch blow molding method for manufacturing a stretched bottle in which a parison is set in a blow mold to be stretched by air-blow, characterized in that the method comprises steps of: setting a curved parison having been curved by a parison deforming means in a cavity disposed inclinedly relative to a lip mold in a manner that a bottom of the parison is directed to a bottom of the cavity; and supplying compressed air into the deformed parison.

According to still another aspect of this invention, there is provided a stretch blow molding method for manufacturing a stretched bottle in which a parison is set in a blow mold to be stretched by air-blow, characterized in that the method comprises steps of: setting, in a cavity, a stretched and deformed parison having been stretched by a stretching rod in its longitudinal direction and deformed by a parison deforming means in a state wherein its bottom contacts an approximately central position of a bottom of the cavity; and supplying compressed air into the parison. According to still another aspect of this invention, there is provided a parison producing method of producing a deformed or curved parison for blow molding, characterized in that a body portion of a straight parison is slidably contacted a curved surface heated by a heating means and is deformed in a deforming mold.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

In the accompanying drawings:

FIG. 4 is a view showing a state where the bottle of FIG. 1 is formed by a method of this invention;

FIG. 5 is a view showing a state where a bottle is formed by a conventional method;

FIGS. 34(a) and (b) are two explanatory views showing a principle of a parison deforming method, respectively;

FIGS. 35(a), (b) and (c) are three explanatory views showing a concrete way of the parison deforming method, respectively;

DETAILED DESCRIPTION OF THE INVENTION

First Embodiment

Figure 1:
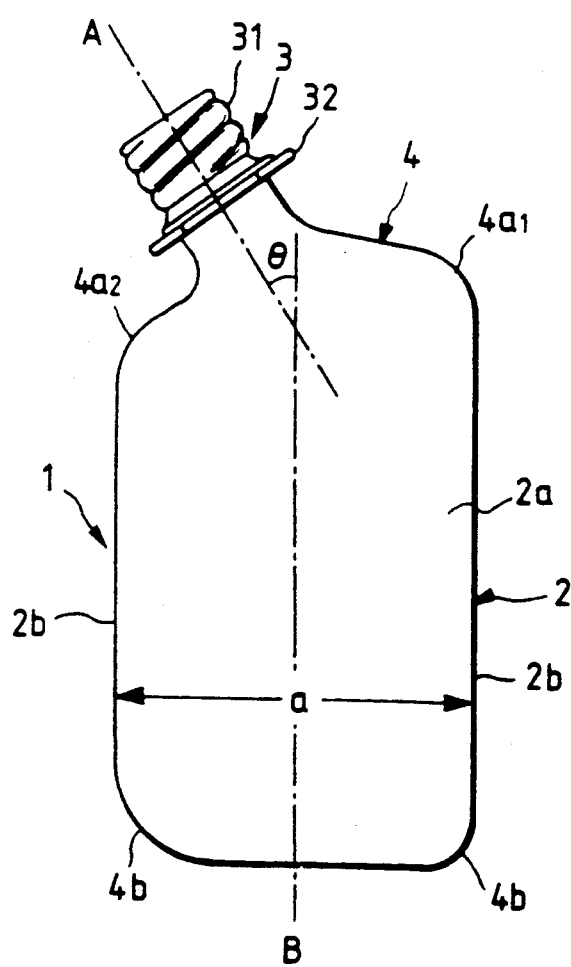
FIG. 1 is a front view of a bottle of this invention formed by a biaxial orientation operation.
Figure 2:
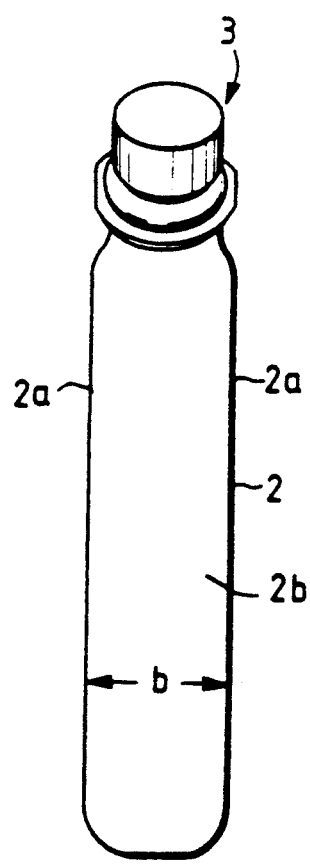
FIG. 2 is a side view of the bottle of FIG. 1.
Figure 8:
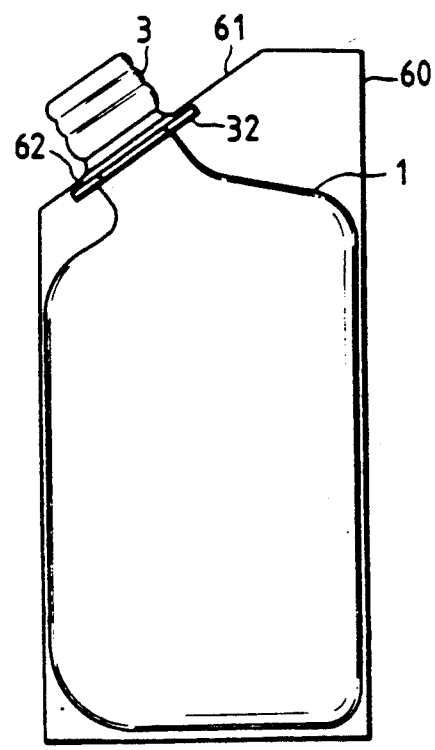
FIG. 8 is a vertically sectional view of a combined container of this invention.

FIGS. 1 and 8 show a first embodiment of this invention. In FIGS. 1 and 2, a bottle comprises a rectangular body portion 2, a cylindrical mouth portion 3, and a shoulder portion 4 between the body portion 2 and the mouth portion 3. The body portion 2 is flat and rectangular, and the thickness b of the body portion 2 is sufficiently small with respect to the width a thereof. The corners and edges of the body portion 2 have smooth curved shapes. The mouth portion 3 has a thread portion 31 and a flange 32. The center line A of the mouth portion 3 is inclined at an angle $\theta$ with respect to the center line B of the body portion 2. The inclined angle $\theta$ is properly determined and, however, is preferably determined at 30° to 45° in view of design or utility. The center line A is parallel to the side surfaces 2a, 2a of the body portion 2, and the mouth portion 3 is not projected laterally from the extensions of the side surfaces 2a, 2a, and the front and back surfaces 2b, 2b. Accordingly, the bottle can be smoothly inserted in a pocket or the like, and it is convenient to pour the contents of the bottle into a cup or the like. Since the mouth portion 3 is inclined, the right shoulder $4a_1$ is formed large while the left shoulder $4a_2$ is formed small. However, either one should be a smooth curved surface. This shape ensures a smooth insertion into a pocket or the like.

Figure 3:
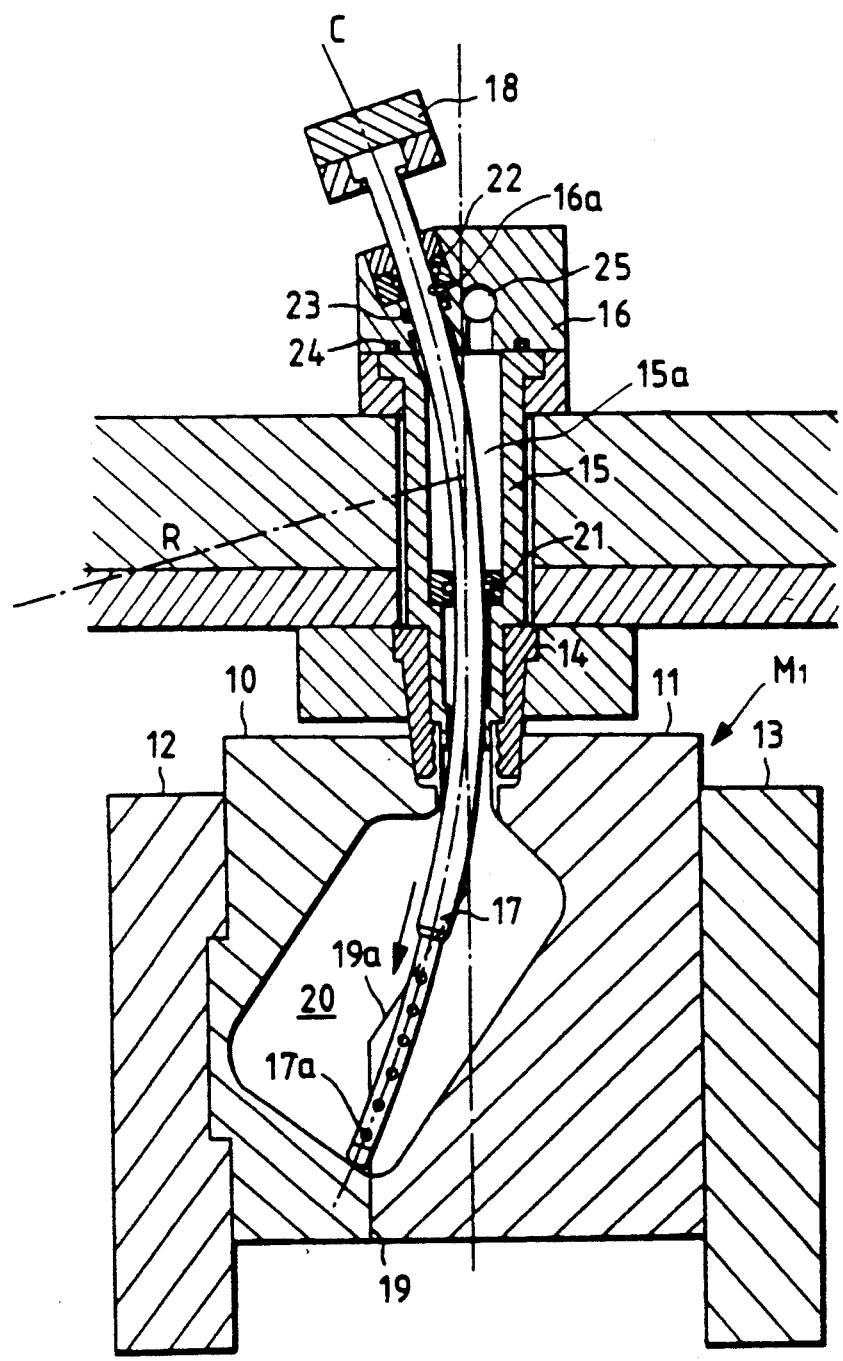
FIG. 3 is a sectional view of a stretch blow molding apparatus for forming the bottle shown in FIG. 1.

FIG. 3 shows an example of a blow molding apparatus for producing the bottle 1 of this invention. The blow molding apparatus comprises a blow mold $M_1$ formed of two blow half molds 10, 11, two platens 12, 13 for driving the blow half molds 10, 11, a lip mold 14 for forming the mouth portion 3 of the bottle 1, a blow mandrel 15, a fastening block 16 for holding the blow mandrel 15, a stretching rod 17 for drawing or stretching a blow material (parison) and a fastening block 18 for holding the stretching rod 17. The blow half molds are joined with each other along a parting plane 19 having an inclined plane 19a located substantially along the center line of a cavity 20. The parting plane 19 facilitates the removal of a bottle out of the half molds 10, 11 even if its mouth portion is disposed inclinedly (in an inclined manner). Because a sectional area of the bottle taken along the plane 19 becomes smaller than that of the bottle taken along a plane parallel to the side surface of the cavity 20 opposed to the side surface 2a of the bottle 1 (a paper surface). This decreases a mold clamping force and prevents generation of an undercut when the half molds 10, 11 are separated and minimizes a closing and opening stroke of the half molds 10, 11. The cavity 20 has a configuration corresponding to a desired shape of a bottle.

The stretching rod 17 is moved in a reciprocatingly ( in a reciprocating manner along a curved line C having a radius of curvature R and is curved along the line C. In order to guide the stretching rod 17, the fastening block 16 has a curved through hole 16a, and the blow mandrel 15 has a through hole 15a. In the through hole 15a and the through hole 16a are respectively provided a bearing 21 and a bearing 22 for guiding the stretching rod 17, reciprocatingly. The block 16 has two seal rings 23, 24 to maintain air-tightness, and an air-blow path 25 through which compressed air is supplied into the cavity 20. The stretching rod 17 has a large number of air injection holes and may have a heater for a heat treatment of a bottle after biaxial orientation blow molding when the occasion demands.

FIG. 4 shows a state in which a straight parison 26 having its bottom is set in the cavity 20 of the blow mold M₁ shown in FIG. 3. The mouth portion 26a of the parison 26 is held by the lip mold 14. With this state, the curved stretching rod 17 is inserted into the parison 26. The stretching rod 17 is moved along the curved line C which contacts a point P on the inner surface of the bottom of the cavity 20. Therefore, when the parison 26 is stretched by compressed air to be expanded during biaxial orientation blow molding, the expansion of the parison 26 is not obstructed by the side surfaces of the cavity 20. The distal end 17' of the stretching rod 17 abuts against the bottom surface of the cavity 20 as the parison 26 is stretched, and, therefore, the parison 26 is smoothly expanded. This construction ensures a uniform biaxial blow orientation of the parison 26 thereby to obtain a shape of a bottle corresponding to a cavity having a desired shape. Accordingly, the problem of the thickness of the shoulder portions 4 of the body 2 becoming very thin is avoided.

In contrast, as shown in FIG. 5, in the case that a straight stretching rod 117 is used, the stretching rod 117 inserted into the parison 26 contacts the lower inclined surface 20a of the cavity 20 because the mouth portion 3 is disposed inclinedly. This causes an uneven portion on the side surface of the bottle formed by the biaxial orientation blow molding. Further, a stretching magnification at a certain portion of the bottle is remarkably different from other portions thereof to generate a terrible unevenness in wall thickness.

Figure 6:
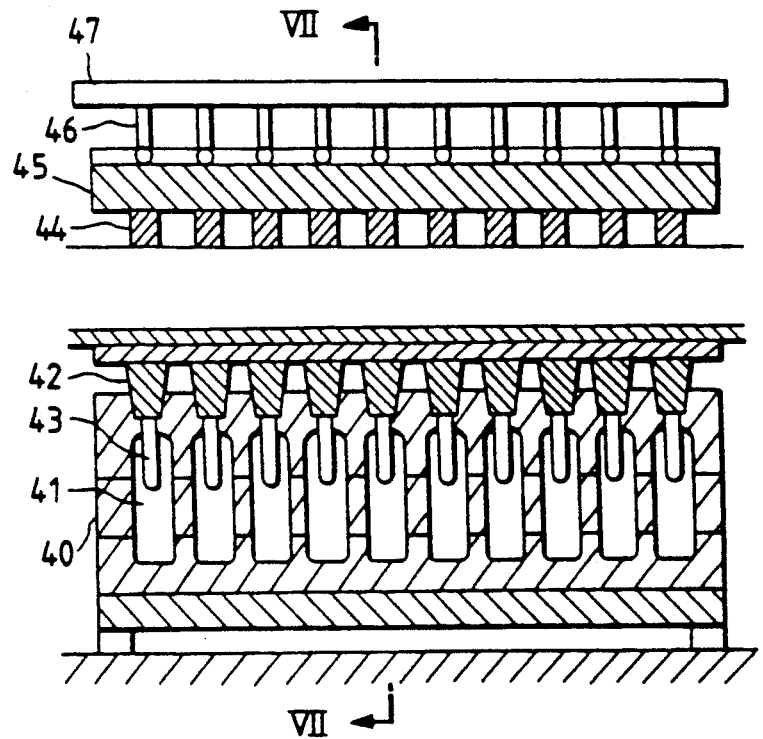
FIG. 6 is a vertically sectional view of a stretch blow molding apparatus of this invention.
Figure 7:
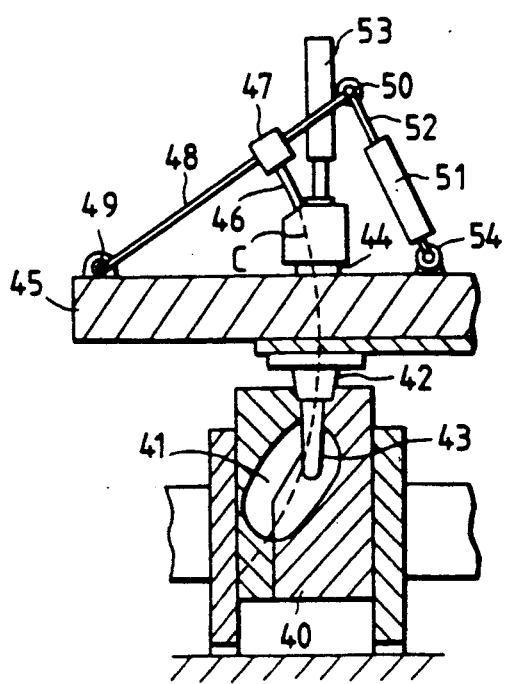
FIG. 7 is a sectional view taken along the line VII—VII in FIG. 6.

FIG. 6 shows an blow molding apparatus for manufacturing a lot of bottles simultaneously. In this embodiment, ten bottles are manufactured simultaneously. The blow mold 40 has ten cavities 41 and the lip mold 42 of each cavity 41 holds a parison 43. The lip mold 42 receives each of blow mandrels 44 which are supported by a blow mandrel fastening block 45. In the same manner as shown in FIG. 3, each stretching rod 46 passes through respective two through holes in each blow mandrel 44 and blow mandrel fastening block 45. In this embodiment, each stretching rod 46 is held by a block 47 extending laterally and moved reciprocatingly simultaneously. Each stretching rod 46 is driven by a device shown in FIG. 7 at the same time. A connecting rod 48 is pivotably connected to the blow mandrel fastening block 45 extending laterally at a point 49 and the upper end 50 of the rod 48 is pivotably connected to a piston 52 of a hydraulic cylinder 51. The lower end of the hydraulic cylinder 51 is pivotably connected to the blow mandrel fastening block 45 at a point 54. A hydraulic cylinder 53 is provided for driving the blow mandrel 44.

When the blow molding apparatus is used, first, a parison 43 is fixed to each lip mold 42 to be inserted into each cavity 41, and each blow mandrel 44 is then lowered by each hydraulic cylinder 53 to be engaged with the lip mold 42. Thereafter, each hydraulic cylinder 51 is driven to insert each stretching rod 46 into each parison 43. With this state, compressed air is supplied into the parison 43 While the stretching rod 46 is moved downward along the curved line C to carry out a biaxial orientation blow molding operation.

FIG. 8 shows a combined container of the bottle 1 and a flat outer box 60 made of paper for accommodating the bottle 1 therein. The box 60 has, at its upper portion, an inclined surface 61 having an opening 62 through which the mouth portion 3 of the bottle 1 is projected when the bottle 1 is accommodated in the box 60.

In order to hold steadily the flange 32 of the mouth portion 3 in the opening 62 of the box 60, a lot of means can be used, and hot melt adhesive is preferable. The inner and outer surfaces of the paper box 60 may be coated with a resin coating layer when the occasion demands, and desired letters and pictures may be printed on the outer surface thereof. The material of the box 60 is not limited to paper. Polyester resin derived from saturated carboxylic acid and saturated dihydric alcohol may be suitable for the thermoplastic resin employed for the biaxial orientation blow molding bottle of this invention. As the saturated carboxylic acids, there may be used aromatic dicarboxylic acids such as terephthalic acid, isophthalic acid, phthalic acid, naphthalene-1, 4-and 2, 6-dicarboxylic acid, diphenylether-4, 4'-dicarboxylic acid, and the like; aliphatic dicarboxylic acids such as adipic acid, sebacic acid, azelaic acid, 1, 10-decane-dicarboxylic acid, and the like; and alicyclic dicarboxylic acids such as cyclohexane dicarboxylic acid. As the saturated dihydric alcohols, there may be used aliphatic glycols such as tetramethylene glycol, diethylene glycol, polyethylene glycol, polypropylene glycol, polytetramethylene glycol, hexamethylene glycol, dodecamethylene glycol, neopentyl glycol, and the like; alicyclic glycols such as cyclohexane dimethanol, and the like; and aromatic diols such as 2, 2-bis (4'-β-hydroxyethoxyphenyl) propane. Particularly suitable polyesters are polyethylene terephthalates derived from terephthalic acid and ethylene glycol.

The polyester resins useful in the invention have an intrinsic viscosity of 0.5 to 1.5 and preferably 0.55 to 0.8. These polyester resins can be prepared by melt polymerization and processed by reduced pressure treatment at temperatures of 180° C. to 250° C. or by heat treatment in inert gas, or be prepared by solid phase polymerization with reducing of content of oligomer and acetaldehyde.

The polyester resins employed in the invention may be mixed with other resins and additives, e.g., a stabilizer, a pigment, an antioxidant, a heat stabilizer, an ultraviolet stabilizer, an antistatic agent, an antimicrobial agent.

The bottle 1 may have, on the rectangular body portion 2, some reinforcing ribs extending vertically and horizontally.

A concrete example of this invention will now be explained.

The bottle 1 shown in FIGS. 1 and 2 was manufactured in the following manner.

First, a parison 26 made of polyethylene terephthalate resin was set in the apparatus of FIG. 3. The outer and inner diameters of the mouth portion of the parison 26 were 22 mm and 17 mm, respectively, and the thickness of the wall of the body portion 2 was 0.45 mm.

The lip mold of the apparatus had a center line coinciding with the center line of the mouth portion of the parison 26) which inclinedly intersects, at 30 degrees, the center line of the cavity 20 (coinciding with the center line of the body portion 2 of the bottle 1).

The blow mold $M_1$ was heated at a temperature of approximately 60° C. While the parison 26 was heated at a temperature of 100° C. to 115° C. compressed air was injected at an atmospheric pressure of 25. As the parison 26 was stretched or drawn in the longitudinal direction, the stretching rod 17 was inserted gradually deeply into the cavity 20 until the stretching rod 17 abuts against the bottom surface of the cavity 20 through the bottom surface of the bottle 1 formed by the biaxial orientation molding operation.

The body portion 2 of the bottle 1 obtained in this manner, has generally an even thickness of its wall and the thicknesses of the shoulder portions $4a_1$ $4a_2$ and the bottom corner portions $4b$, $4b$ (FIG. 1) were 0.35 mm and 0.25 mm, respectively.

In contrast, the straight stretching rod 117, shown in FIG. 5, was used to manufacture a bottle under the same condition as the above example except the stretching rod 117. The thus obtained bottle had some uneven portions on the side walls and uneven thicknesses of the walls as a whole. The shoulder portions $4a_1$, $4a_2$ and bottom corners $4b$ have thicknesses of 0.43 mm and 0.18 mm, respectively.

Second Embodiment

Figure 9:
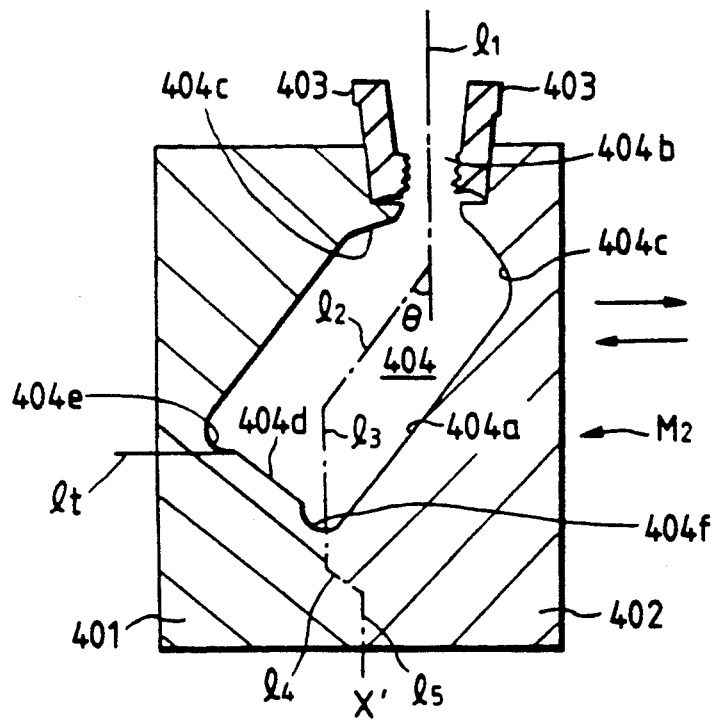
FIG. 9 is a cross sectional view of a blow mold of this invention.

FIG. 9 shows another embodiment of a blow mold $M_2$ for an orientation blow molding operation. The mold $M_2$ has two half molds 401, 402 and a lip mold 403. A cavity 404 formed by the two half molds 401, 402 comprises a rectangular body portion 404a whose corner or edge portions are smoothly curved, a cylindrical mouth portion 404b and a shoulder portion 404c connecting the rectangular body portion 404a with the mouth portion 404b. The center line (axis) $l_1$ of the mouth portion 404b is inclined with respect to the body portion 404a. That is, the center line (axis) $l_2$ of the body portion 404a intersects the center line $l_1$ of the mouth portion 404b at an angle $\theta$. The bottom surface of the cavity 404 has a raised center portion 404d thereof to increase the strength of a bottle to be formed, and the raised portion 404d is formed in one half mold 401 in an inclined manner. In the case of the provision of the raised portion 404d, the tangential line $l_t$ of a recessed portion 404e, as an upper corner portion of the cavity 404, adjacent to the raised portion 404d should be located in a position above a horizontal line (a line indicating the direction where the half molds 401, 402 are opened and closed) to avoid the generation of an undercut.

A parting plane X—X' between the two half molds 401, 402 comprises a vertical plane along the center line $l_1$ extending vertically of the mouth portion 404b of the cavity 404, an inclined plane along the center line $l_2$ inclined at an angle $\theta$ with respect to the line $l_1$, a vertical plane along a line $l_3$ passing vertically through a recessed portion 404f as a lower corner portion adjacent to the raised portion 404d, an inclined plane along an inclined short line $l_4$ extending toward the center point between the two half molds 401, 402 and a vertical plane along a vertical line $l_5$ passing the approximately intermediate point between the two half molds 401, 402. A parting plane X—X' is formed with the five combined planes extending perpendicular to the paper surface on which drawings are described. In the mouth portion 404b, a part of the parting plane X—X' extends approximately vertically, and, therefore, it is desirable that the molds 401, 402 are clamped while moving in the lateral direction. A center portion of the body portion 404a of the cavity 404 is divided into two portions approximately symmetrically in the left and right direction because its parting plane is disposed along the inclined center line $l_2$ of the cavity 404. Therefore, the two molds 401, 402 can be easily released at the time of a mold releasing operation. Moreover, since the parting line $l_3$ passes through the recessed portion 404f, an occurrence of an undercut can be avoided. The parting plane extending along the inclined line $l_4$ is not necessarily provided. However, if such a parting plane is provided, a vertical deviation between the two molds 401, 402 and an increase of a mold clamping force can be avoided due to the combination of the two parting planes along the lines $l_2$, $l_4$ which are inclined opposite to each other when the two molds 401, 402 are clamped with each other. This ensures a good mold clamping, an accuracy of dimension of a bottle to be formed and an evenness of volume thereof.

Further, since the line $l_5$ is extended vertically, a mold clamping operation in the lateral direction can be reliably performed.

Figure 10:
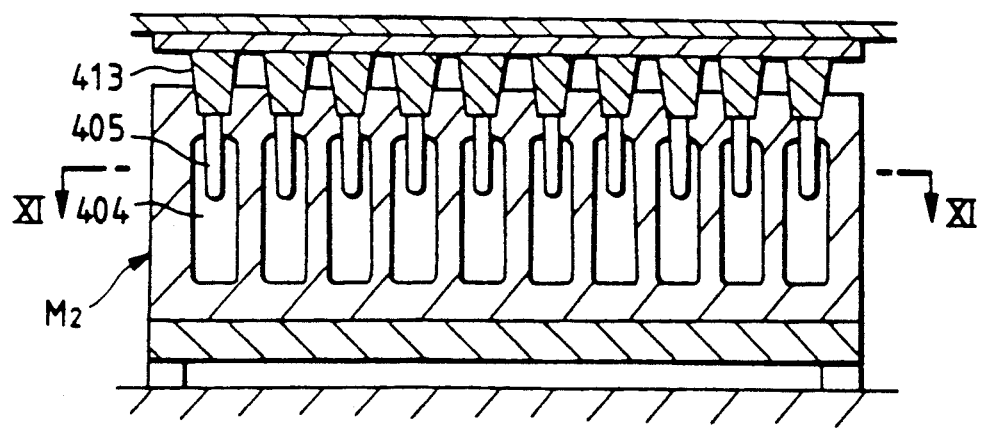
FIG. 10 is a longitudinal sectional view of the blow mold of FIG. 9.
Figure 11:
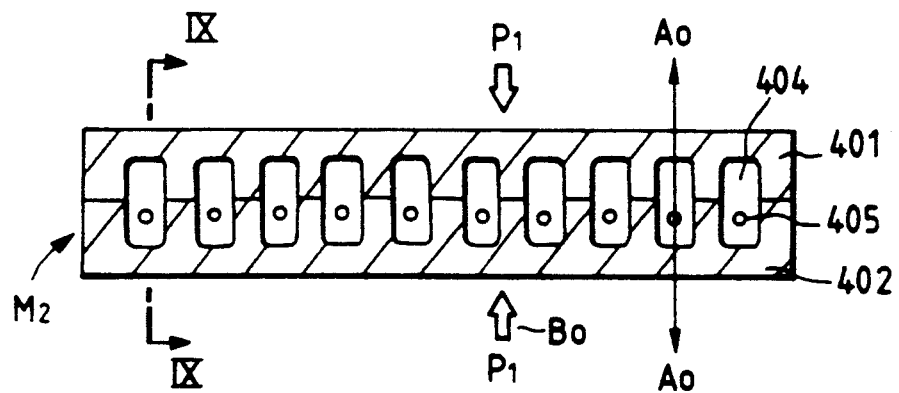
FIG. 11 is a sectional view taken along the line XI—XI in FIG. 10.

FIGS. 10 and 11 show a blow molding apparatus accommodating the blow mold $M_2$ shown in FIG. 9. A large number of cavities 404 are provided in a line in the blow mold $M_2$. To each of its mouth portion is fixed a parison 405 whose upper end is held by a lip mold 413. In this blow molding apparatus, as the longitudinal direction $A_o-A_o$ of a cross section of each cavity 404 coincides with the direction $B_o$ where the two half molds 401, 402 are opened and closed. That is, the width of the cross section of each cavity 404 is small. Therefore, the disposition of the cavities 404 causes a large number of cavities to accommodated in the mold $M_2$.

Figure 12:
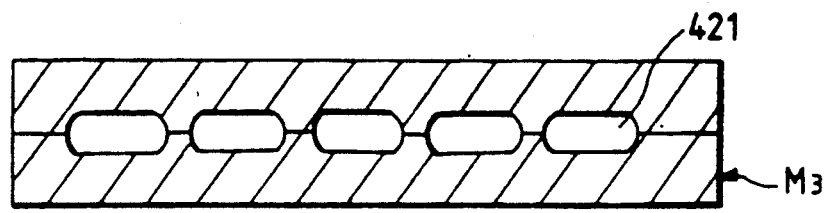
FIG. 12 is a sectional view of a stretching blow mold in which each cavity is disposed in a manner different from that of FIG. 11.

In contrast, if some cavities 421 are, as shown in FIG 12, disposed in a blow mold $M_3$ in such a manner that the longitudinal direction in cross section of each cavity 421, as shown in FIG. 12, coincides with the longitudinal direction of the mold $M_3$, the number of the cavities 421 to be disposed in the mold $M_3$ becomes small in comparison with that shown in FIGS. 10 and 11. Accordingly, the blow molding apparatus shown in FIGS. 10 and 11 increases efficiency of manufacturing of bottles.

In addition, in the mold $M_2$ of the blow molding apparatus shown in FIGS. 10 and 11, the sectional area of each cavity 404, taken along the parting plane is remarkably smaller than that of each cavity 421 of the mold $M_3$ shown in FIG. 12. This results in a relatively small clamping force $P_1$ and a tight contact between the two half molds 401, 402. The tight contact avoids an occurrence of burr or fin.

In the first embodiment mentioned above, the straight parison 26 is located in the cavity 20 and then stretched by compressed air while the curved stretching rod 17 is inserted gradually deeply into the cavity 20. However, the inventors of this invention found that a bottle having an inclined mouth can be easily manufactured, without using a curved stretching rod, by supplying compressed air into a curved parison held in a cavity.

Figure 13:
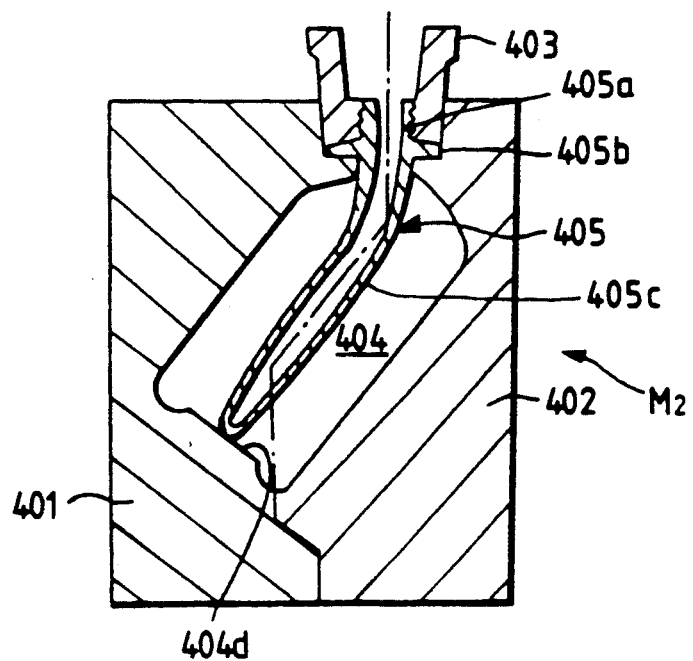
FIG. 13 is a cross sectional view of the blow mold for showing a state wherein a parison is subject to a stretch blow molding operation of this invention.

That is, as shown in FIG. 13, a stretched and curved parison 405 is set in the cavity 404. First, the straight parison is subjected to a uniaxial orientation or stretching operation to be stretched longitudinally. Then the stretched parison 405 is curved so that the bottom end of the parison 405 contacts an approximately center portion of the raised portion 404d. With this state, compressed air is supplied into the curved and stretched parison 405. The magnification of stretching of a bottle formed in this manner is the same at each part of the body portion 405c.

The parison 405 has a mouth portion 405a, a flange portion 405b and a cylindrical body portion 405c having a bottom. The curved state of the parison 405 is determined according to a desired shape of the bottle to be formed. In general, in the case of manufacturing of a bottle having a relatively long body portion, a curved portion is located near its mouth portion with a straight portion located on the bottom side thereof. Further, the body portion 405c may be curved uniformly at the same radius of curvature and may have a different radius of curvature at a certain part from other parts.

Figure 14:
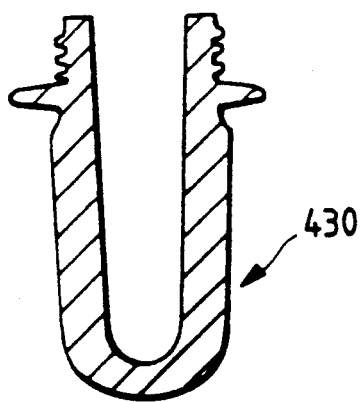
FIG. 14 is a longitudinal sectional view of a parison having not been stretched.
Figure 15:
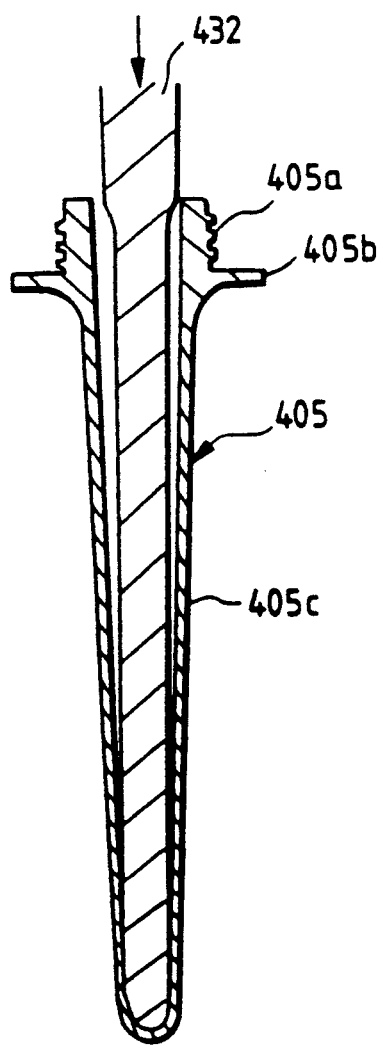
FIG. 15 is a vertically sectional view showing a state wherein a parison is stretched in its longitudinal direction.

The stretched and deformed parison 405 is formed in the following manner. First, a normal parison 430, as shown in FIG. 14, is prepared by a normal way and is, then, subjected to a uniaxial stretching operation. That is, a straight stretching rod 432 is, as shown in FIG. 15, inserted gradually deeply into the normal parison 430 to stretch it longitudinally. The length of the body portion 405c is determined so that the bottom of the body portion 405c contacts the center position of the bottom of the cavity 404.

Figure 16:
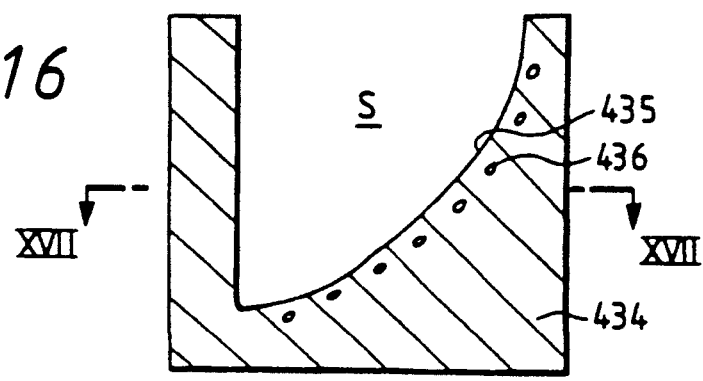
FIG. 16 is a vertically sectional view of a deforming mold for curving a parison.
Figure 17:
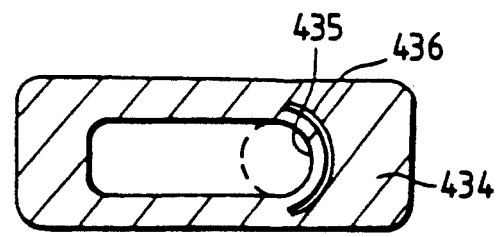
FIG. 17 is a sectional view taken along the line XVII—XVII in FIG. 16.
Figure 18:
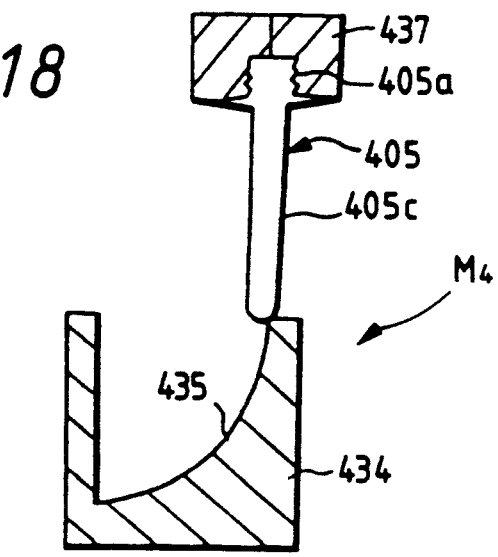
FIG. 18 is an explanatory view showing a first step of a parison deforming process.
Figure 19:
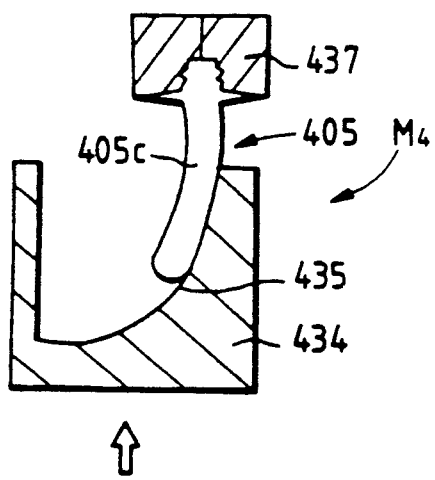
FIG. 19 is an explanatory view showing a second step of the parison deforming process.

The stretched parison 405 is curved or bent by the following device as shown in FIGS. 16 to 21. In FIGS. 16 and 17, a deforming mold 434 has a flat space S as viewed from its upper position. The space S is defined by a curved surface 435 which has an arc shape in vertical section (FIG. 16) and a semicircular shape in cross section (FIG. 17).

The surface 435 may be formed so as to have various shapes. If the surface 435 is formed in a manner that the radius of curvature near the upper opening is determined at a maximum value, the difference in magnification of stretching becomes minimum as a whole when the bottle is formed.

Along the surface 435 is provided some heaters 436 for maintaining a softened condition of the deformed parison.

FIGS. 18 to 21 show a process for deforming the parison 405.

Figure 20:
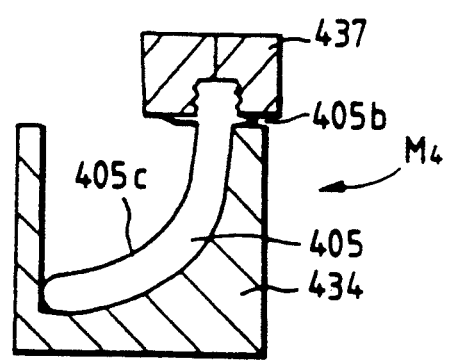
FIG. 20 is an explanatory view showing a third step of the parison deforming process.
Figure 21:
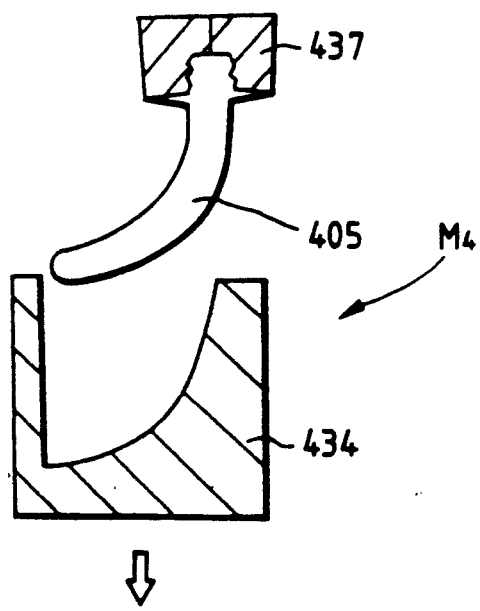
FIG. 21 is an explanatory view showing a fourth step of the parison deforming process.

A softened straight parison 405 is held by a holder 437 which forms a parison deforming apparatus $M_4$ with the deforming mold 434. At this time, the lower end of the parison 405 contacts the upper end of the above surface 435 of the mold 434. Then, the mold 434 is slowly raised and the body portion 405c of the parison 405 slidably contacts the curved surface 435 to be curved along the arched surface 435. When the flange portion 405b of the parison 405 abuts against the upper surface of the mold 434, the mold 434 is stopped, as shown in FIG. 20, to complete a deformation of the parison 405. Thereafter, the mold 434 is moved downward to take the deformed parison 405 out of the mold 434. Thus deformed parison 405 is set in the blow mold $M_2$, as shown in FIG. 13, in a state wherein the bottom end of the parison 405 contacts the center position of the raised bottom portion 404d of the cavity 404. Then, compressed air is supplied into the deformed parison 405 to obtain a bottle which is stretched at almost the same magnification of stretching at all wall portions of the bottle and which has almost the same thickness of the walls at all parts of the bottle.

The stretched and deformed parison 405 may be used in the above blow mold $M_1$, as shown in FIG. 3, of the first embodiment.

The material of the deformed parison 405 may be the same as that of the parison 26, as shown in FIGS. 4 and 5, of the first embodiment. Further, as material of the deformed parison, various multi-layer resins may be used.

The concrete example of this embodiment will now be explained.

First, a straight cylindrical parison made of polyethylene terephthalate resin was prepared. The thickness of the wall of the body portion of the parison was 3.2 mm. The parison was heated at 95° C. to 120° C. to be softened, and, then, a uniaxial stretching operation was performed by inserting longitudinally a stretching rod into the parison. Thus obtained parison had a body portion whose wall thickness was 2.1 mm. The stretched parison was deformed by the deforming mold 434 and through the process shown in FIGS. 18 to 21. The deforming mold 434 was maintained at a temperature of about 90° C. Thus deformed parison had a body portion curved smoothly and an approximately circular shape in cross section. The deformed parison was set in the blow mold $M_2$. At this time, the lower end of the parison abutted against the center position of the bottom surface of the cavity 404. Then, a free blow molding was performed without using a stretching rod. The temperature of the blow mold $M_2$ was then about 50° C. and compressed air had a temperature of 20° C. and an atmospheric pressure of 28. Thus obtained bottle had a body portion with an approximately uniform thickness (about 0.35 mm) of its wall, and a thick portion (corresponding to the projected center position of the bottom of the parison) of wall was located at the center portion of the bottom of the bottle.

Figure 22:
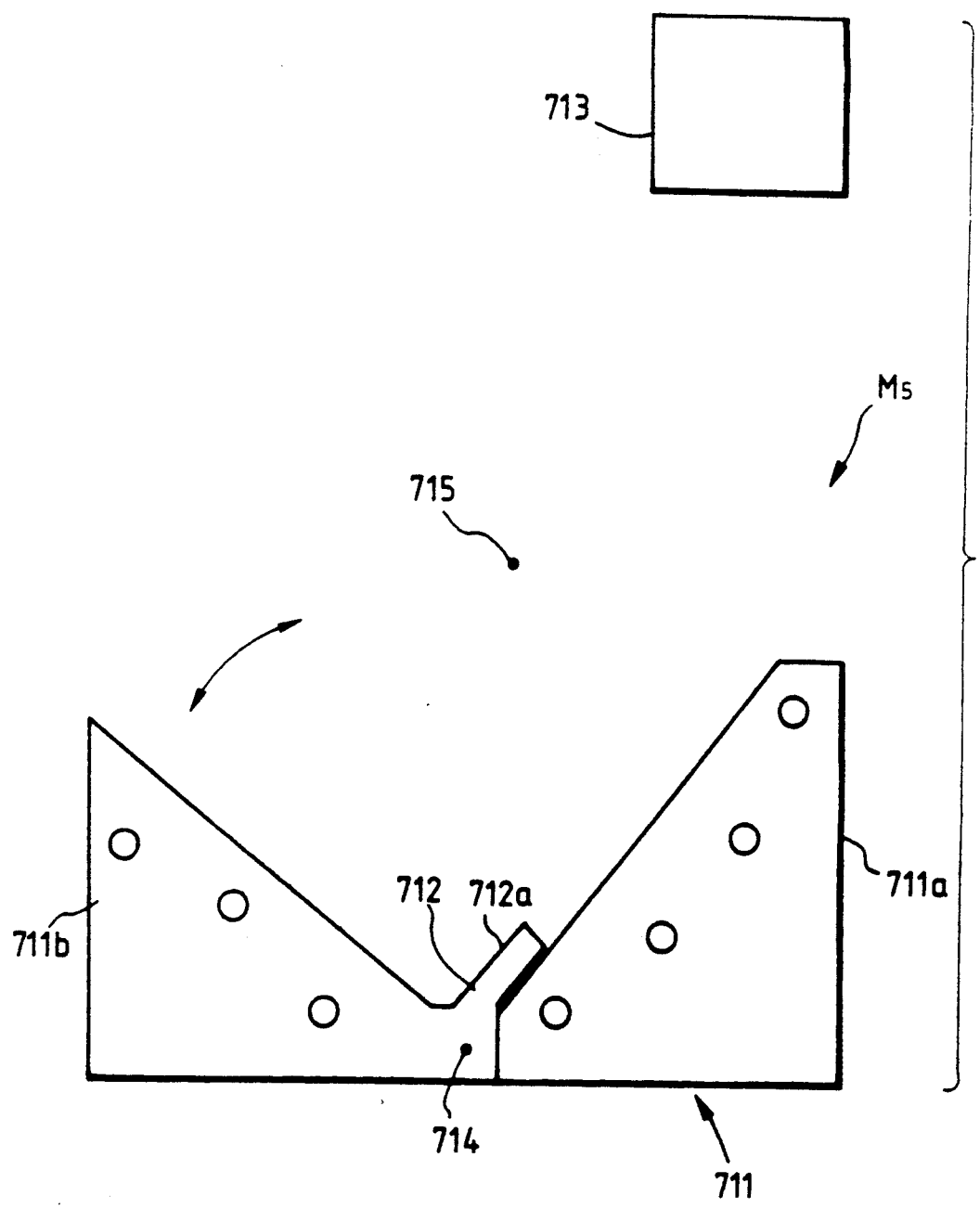
FIG. 22 is a front view of a parison deforming apparatus of this invention.

FIG. 22 shows another parison deforming apparatus $M_5$ for bending the stretched parison 405 in one direction, this is, in its longitudinal direction.

The apparatus $M_5$ has a deforming mold 711 formed of a main body 711a and a supplementary body 711b pivotably connected to the main body 711a by a pin 714. The deforming mold 711 is moved upward and downward. The apparatus $M_5$ further has a holder 713 for holding the stretched parison 405. The holder 713 is fixed to a fixing member (not shown). The supplementary body 711b can be closed and opened and has a handle portion 712 near the pivot pin 714. The fixing member is provided with an operating pin 715 for operating the supplementary body 711b.

Figure 23:
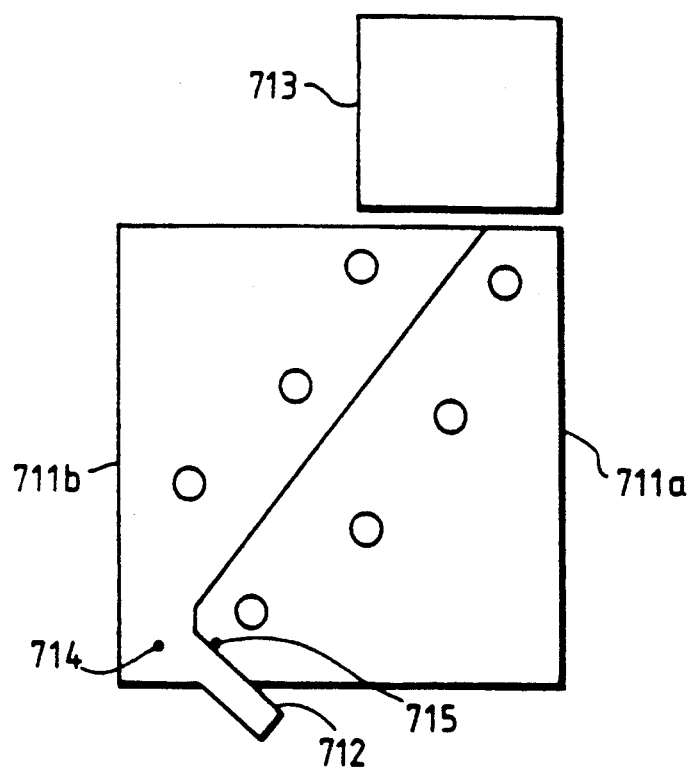
FIG. 23 is a front view of a parison deforming mold in a state wherein the deforming mold is closed.
Figure 24:
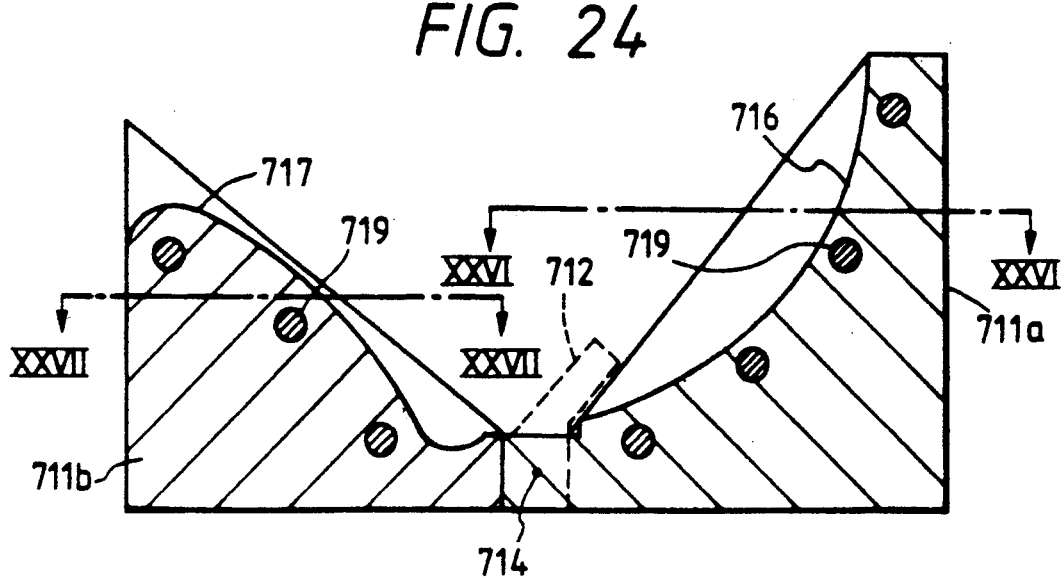
FIG. 24 is a vertically sectional view of the deforming mold of FIG. 22.
Figure 25:
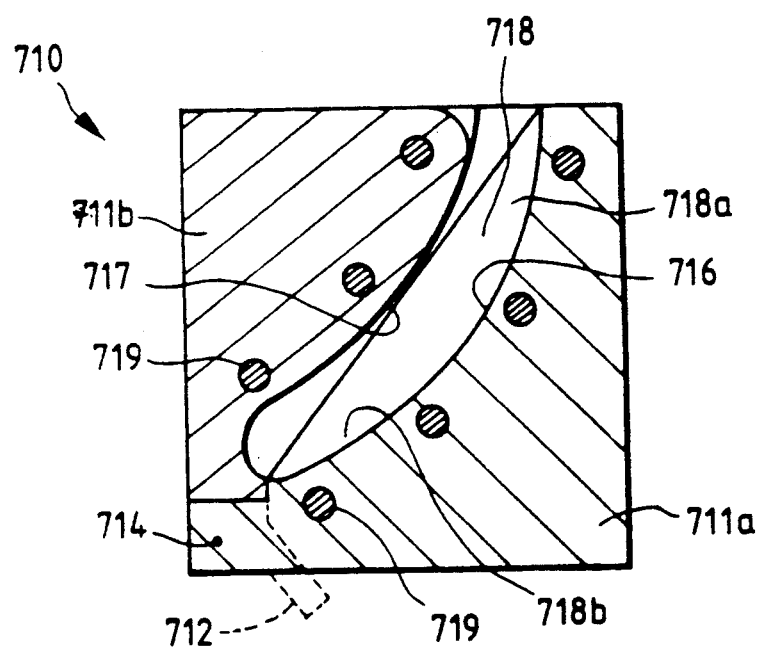
FIG. 25 is a vertically sectional view of the deforming mold of FIG. 23.
Figure 26:
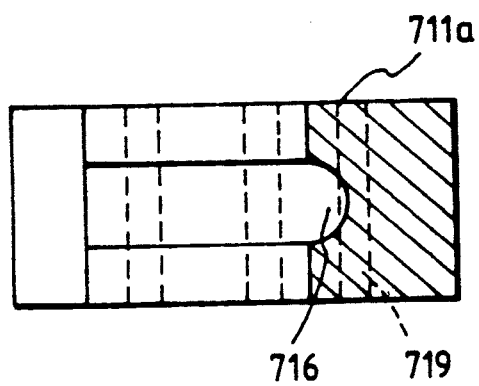
FIG. 26 is a sectional view taken along the line XXVI—XXVI in FIG. 24.
Figure 27:
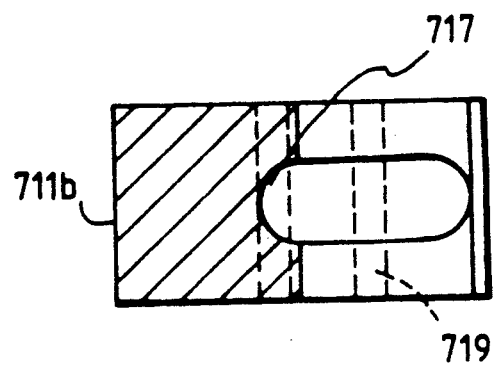
FIG. 27 is a sectional view taken along the line XXVII—XXVII in FIG. 24.

That is, when the deforming mold 711 is raised with the supplementary body 711b being opened, the upper surface 712a of the handle portion 712 abuts against the operating pin 715. When the deforming mold 711 is moved upward further, the engagement of the operating pin 725 and the handle portion 712 causes the supplementary body 711b to move in the clockwise direction as viewed in FIG. 22 thereby to close the main body 711a as shown in FIG. 23. The supplementary body 711b is urged by e.g., a spring (not shown) to open the main body 711a, and, therefore, the supplementary body 711b is swung in the counterclockwise direction to open the main body 711a when the deforming mold 711 is lowered. As shown in FIGS. 24 to 27, the main body 711a and the supplementary body 711b are provided with two arched surfaces 716 and 717, respectively. The arched surface 716 is curved downward while the arched surface 717 is curved upward, and the two curved surfaces 716, 717 are opposed to each other to form a curved space 718 for receiving the deformed parison 405 when the deforming mold 711 is closed. The space 718 has a circular shape in cross section and each of the surfaces 716, 717 has a semicircular shape in cross section as shown in FIGS. 26 and 27. As mentioned before, if the radius of curvature at a portion 718a near the opening of the space 718 is determined minimum, the difference in the magnification of stretching at each position of the parison becomes minimum as a whole when the parison is stretched by compressed air. Accordingly, it is preferable that the magnitude of radius of curvature at an upper portion 718a is relatively large while the magnitude of radius of curvature at a lower portion 718b is relatively small. The diameter and the magnitude of curvature of the space 718 are properly determined according to the condition of the parison to be formed.

Along the curved surfaces 716, 717 are provided a plurality of heaters 719 at a predetermined interval for maintaining a softened condition of the parison while the parison is deformed and for adjusting distribution of temperature of the parison. A heating element such as a thermoelectric element may be substituted for the heaters 719.

Figure 28:
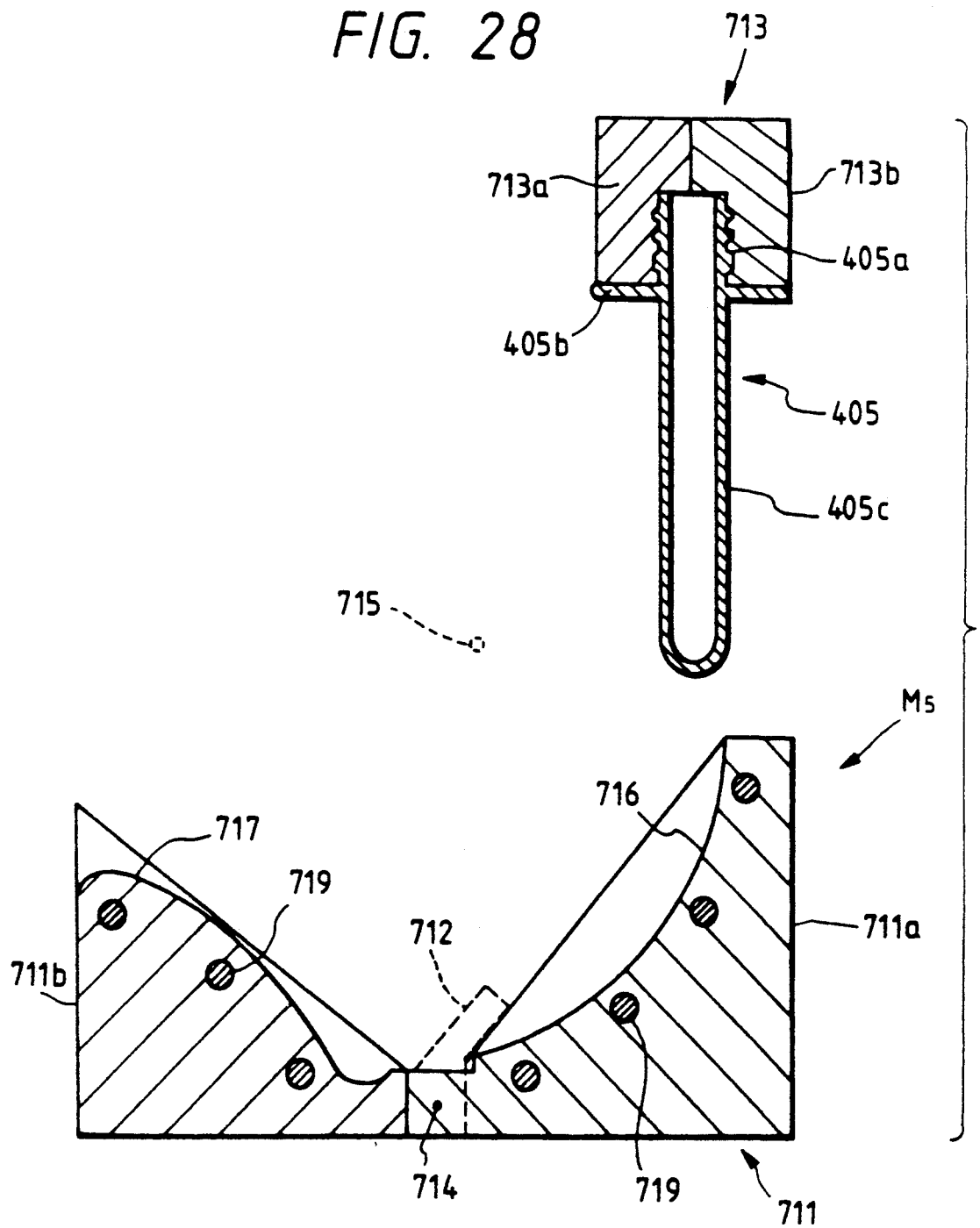
FIG. 28 is an explanatory view showing a first step of another parison deforming process.
Figure 29:
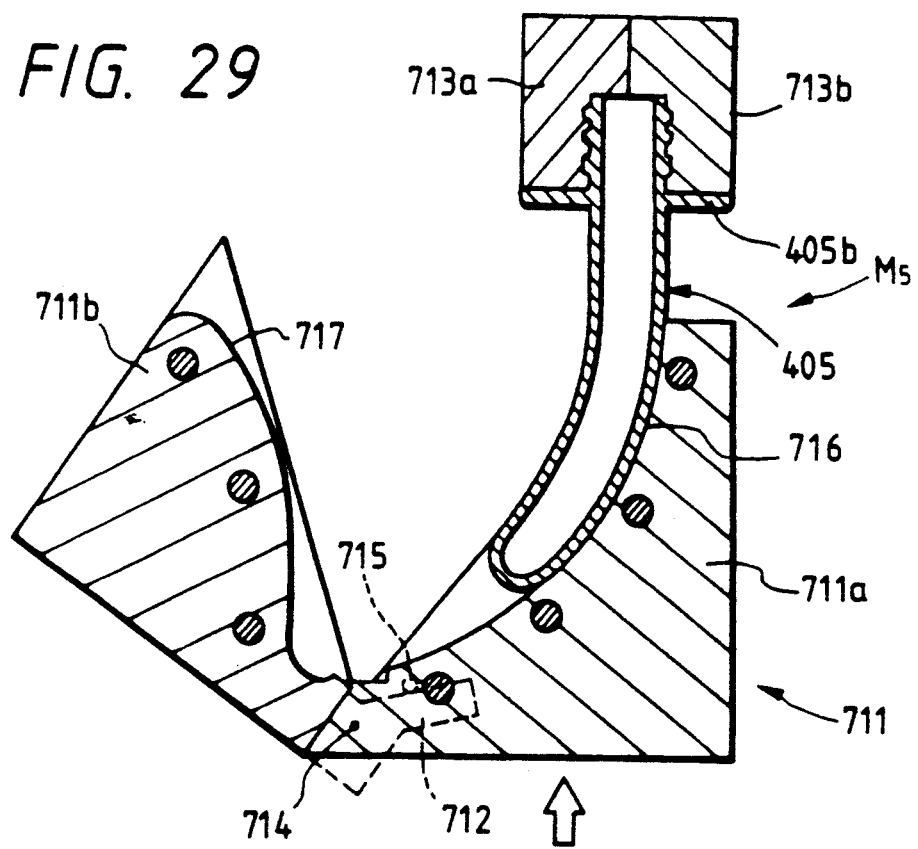
FIG. 29 is an explanatory view showing a second step of the parison deforming process.
Figure 30:
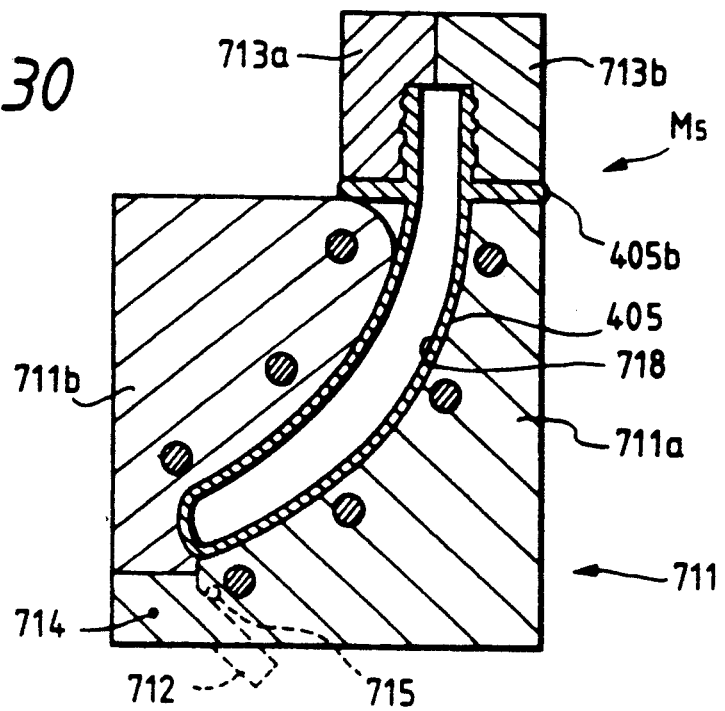
FIG. 30 is an explanatory view showing a third step of the parison deforming process.

The stretched and softened parison 405 having been subjected to a uniaxial stretching operation and to a softening operation is held, at its mouth portion 405a, by the holder 713. The holder 713 comprises two half pieces 713a, 713b which are moved away from and toward each other to hold the parison 405 therebetween. The holder 713 is located in a position above the deforming mold 711. When the deforming mold 711 is raised gradually in a state wherein the deforming mold 71 is opened, the bottom of the body portion 405c of the parison 405 slidably contacts, as shown in FIGS. 28 and 29, the arched surface 716 of the main body 711a, and the body portion 405c of the parison 405 is then bent along the arched surface 716. As the deforming mold 711 is moved upward, the supplementary body 711b of the deforming mold 711 is rotated in the clockwise direction by the cooperation of the operating pin 715 and the handle portion 712 of the supplementary body 711b.

When the deforming mold 711 is moved upward until the flange portion 405b of the parison 405 abuts against the upper surface of the deforming mold 711, the deforming mold 711 is stopped. At this time, the deforming mold 711 is completely closed, and the body portion 405c of the parison 405 is received completely in the space 718. Therefore, the body portion 405c is completely prevented from being exposed to the atmosphere. With this state, the heating temperature is adjusted. In order to carry out a heating treatment accurately, compressed air may be supplied into the parison 405 from its mouth thereby to cause the outer peripheral surface tightly to contact the arched surfaces 716, 717. This causes an increase of heat transfer rate.

Figure 31:
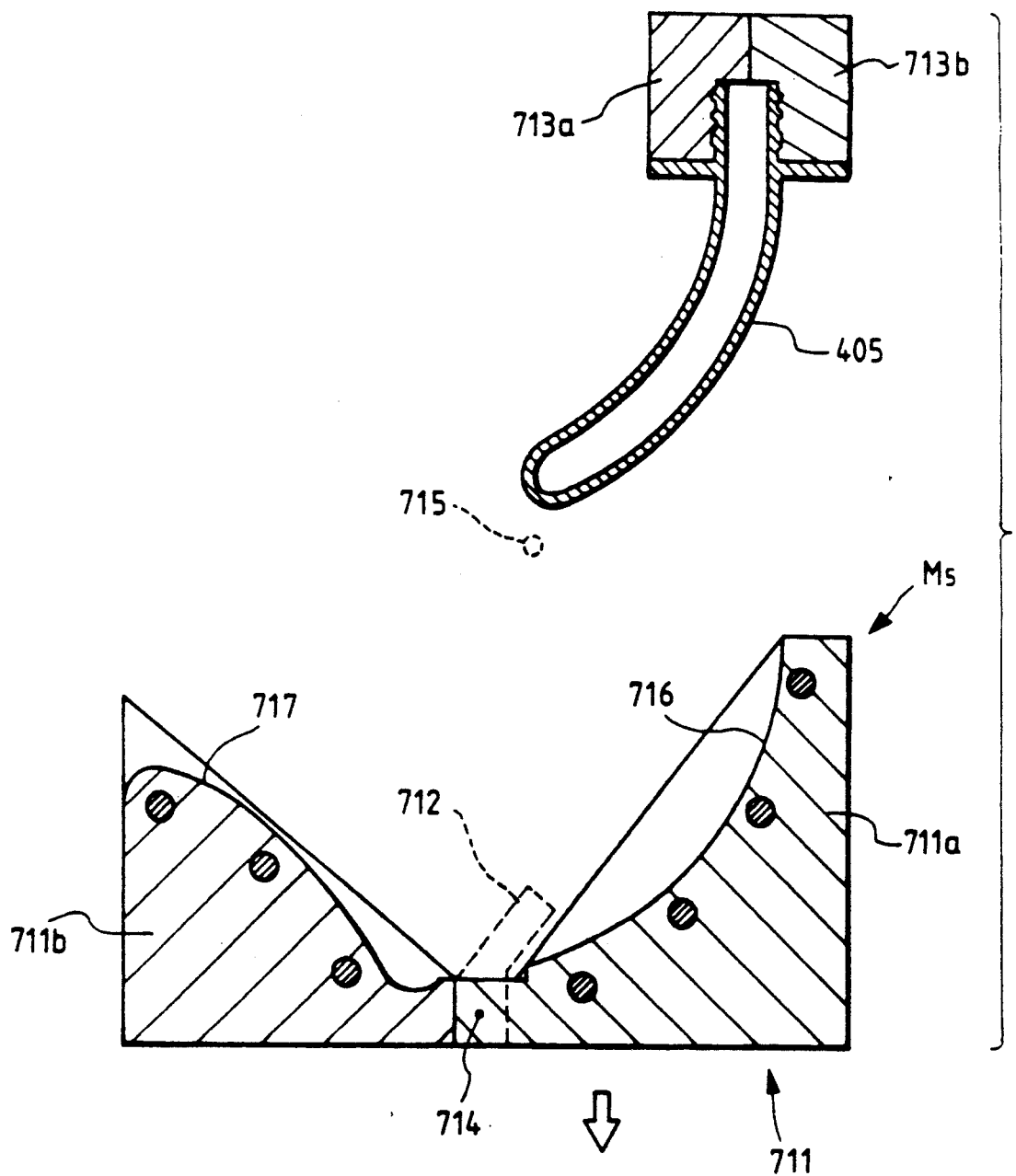
FIG. 31 is an explanatory view showing a fourth step of the parison deforming process.
Figure 32:
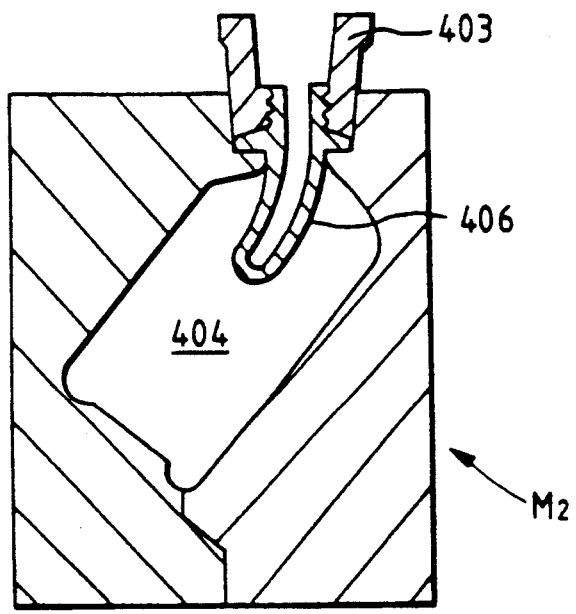
FIG. 32 is a vertically sectional view of a blow mold for showing another method of a stretching blow molding operation.

In this manner, after a deforming operation for the parison 405 has been completed, the deforming mold 711 starts to move downward. As the mold 711 is lowered, the supplementary body 711b is opened, and the curved and deformed parison 405 is taken out of the mold 711 as shown in FIG. 31.

In the above manner, if the parison 405 is deformed under the condition where its body portion 405c is not exposed to the atmosphere, the adjustment of temperature can be performed easily, and the distribution of the temperature for the parison 405 can be properly maintained. This results in a deformed parison having a good quality.

An opening and closing means for opening and closing the deforming mold 711 may be a cam means, an air cylinder or a motor in addition to the combination of the operating pin 715 and the handle portion 712. Further, the supplementary body 711b may be adapted to move away from and toward the main body 711a in the lateral direction to open and close the deforming mold 711.

A concrete example of this embodiment will now be explained.

First, a cylindrical and straight parison having a bottom and made of polyethylene terephthalate resin is prepared. The wall thickness of its body portion was 3.2 mm. This parison was heated at temperatures of 95° C. to 120° C. to be softened and is then stretched by a stretching rod only in its longitudinal direction. The wall thickness of the body portion of the parison subjected to a uniaxial stretching operation was 2.1 mm. This stretched parison was deformed by the deforming mold 711, the whole portion of which was maintained at a temperature of 90° C. Thus obtained deformed parison was set in the blow mold M₂ shown in FIG. 13, whose temperature was about 50° C. The temperature of compressed air was 20° C., and the compressed air was supplied at an atmospheric pressure of 24. Thus obtained bottle had an even wall thickness of 0.35 mm and its thick portion provided at the bottom of the bottle was located at the center position of its bottom.

Third Embodiment

Figure 33:
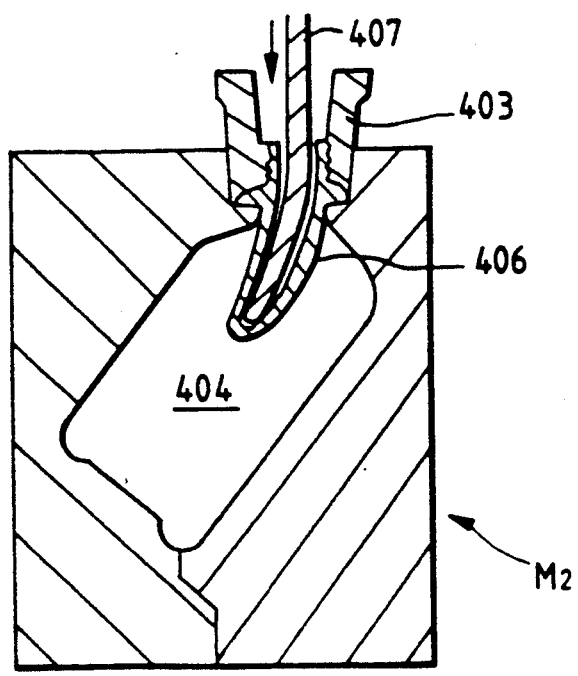
FIG. 33 is a vertically sectional view of a blow mold for showing still another method of a stretch blow molding operation.

In the second embodiment, a parison having been stretched in one direction and having been curved is set in the blow mold. However, a parison 406 curved without being stretched may be set in the blow mold. In this case, the bottom of the parison 406 is directed to the bottom of the cavity 404 of the blow mold M₂. With this state, when compressed air is supplied into the parison 406, the bottom of the parison abuts against the bottom of the cavity 404. However, it is, as shown in FIG. 33, preferable to use a stretching rod 407 to prevent the bottom of the parison from being deviated in the lateral direction of the cavity 404 from the center position of the cavity 404.

In this case, a stretching rod having been curved beforehand as a whole can be used, and, however, instead, a stretching rod with only its distal end curved beforehand may be used. As the stretching rod with its distal end curved, for example, it is possible to use a stretching rod with a spring or flexible tube in which a wire is connected to the distal end of the stretching rod.

In this stretching rod, when the wire is pulled, the spring or the flexible tube is shrunk to straighten the stretching rod. However, when the wire is released, the spring or the flexible tube is curved automatically.

FIGS. 34 to 37 show three means for curving the parison 512 which has not been stretched yet. That is, a pushing bar 514 pushes, as shown in FIG. 34, the body portion 512c in a state wherein the mouth portion 512a of the parison 512 is held by a holder 513. The parison is softened beforehand and may be softened in a blow mold 517. Therefore, the parison 512 is deformed easily. A position where the pushing bar 54 pushes the parison 512 can be properly selected according to its curved condition. The pushing bar 514 is slidably provided in the blow mold 517 as shown in FIG. 35(a). When the straight parison 512 is set in the blow mold 517, the pushing bar 514 is moved horizontally to push its body portion 512c to bent the parison 512 (FIG. 35(b)), and the pushing bar 514 is, then, retreated (FIG. 35(c)).

Figures 36A, 36B:
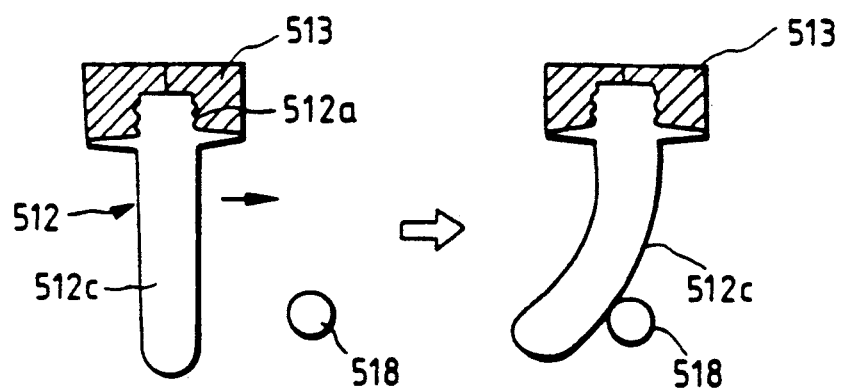
FIGS. 36(a) and (b) are two explanatory views showing another parison deforming method, respectively.
Figures 37A, 37B:
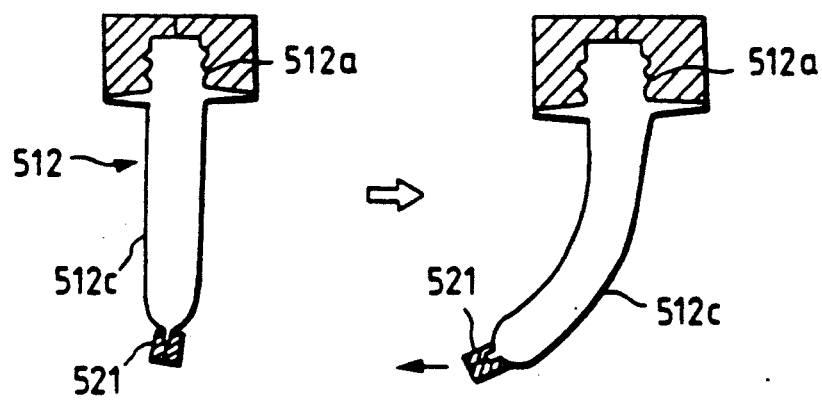
FIGS. 37(a) and (b) are two explanatory views showing still another parison deforming method, respectively.

Instead of the pushing bar 514, a roller 518 can be used as shown in FIGS. 36(a) and (b). Since the roller 518 can be rotated freely, the frictional force on the surface of the parison 512 becomes small. Further, instead of the pushing bar 514, a holding member 521 for clamping the distal end of the parison 512 can be used as shown in FIGS. 37(a) and (b). The holding member 521 is moved horizontally in a blow mold. In FIGS. 34 to 37, the pushing bar 514, the roller 518 and the holding member 512 are moved horizontally. However, instead of those members, the parison 512 may be moved horizontally with respect to those members 514, 518, 520 fixed to a member (not shown).

The pushing bar 514, the roller 518 and the holding member 521 may be used for a stretched parison 405(FIG. 15) which is drawn or stretched in the longitudinal direction instead of the deforming molds 434, 711. In addition, the deforming mold 711 can be used for deforming a parison which has not been stretched in its longitudinal direction.

What is claimed is:

1. A stretch blow molding method for manufacturing an expanded bottle in which a parison is set in a blow mold to be expanded by air-blowing, comprising the steps of:
   a) preparing a straight cylindrical parison made of resin;
   b) stretching the straight cylindrical parison in its longitudinal direction so as to have a predetermined length;
   c) curving the stretched parison by bringing the stretched parison into contact with a curved and heated surface which is formed in a deforming mold having an open space through which the stretched parison is inserted into the deforming mold while the stretched parison contact the curved and heated surface and through which the curved parison is removed from the deforming mold;
   d) setting the curved parison in a cavity inclinedly formed in the blow mold; and
   e) blowing air into the curved parison thereby forming the bottle.

2. A stretch blow molding method according to claim 1, wherein said curved and heated surface has a semicircular shape in cross section for contacting an outer round surface of the stretched parison.

3. A stretch blow molding method according to claim 1, further comprising holding the stretched parison by the holder, and moving the deforming mold and the holder relatively away from and close to each other in a direction where the stretched parison is extended, and slidingly contacting the stretched parison with the curved and heated surface when the holder and the deforming mold are moved close to each other during the curving step.

4. A stretch blow molding method according to claim 1, wherein the curved and heated surface has a maximum radius of curvature near an upper opening of the open surface.

5. A stretch blow molding method according to claim 1, wherein a plurality of heaters are disposed along the curved and heated surface.

6. A stretch blow molding method according to claim 1, wherein the step of stretching the straight cylindrical parison includes stretching the straight cylindrical parison so as to have such a length that a bottom of the stretched and curved parison contacts an approximately center portion of a bottom of the cavity when the stretched and curved parison is set in the cavity formed in the blow mold.

7. A stretch blow molding method according to claim 1, wherein the step of stretching the straight cylindrical parison includes stretching the straight cylindrical parison unidirectionally by a stretching rod while being heated.

8. A stretch blow molding method for manufacturing an expanded bottle in which a parison is set in a blow mold to be expanded by air-blowing, comprising the steps of:
   a) preparing a straight cylindrical parison made of resin;
   b) stretching the straight cylindrical parison in its longitudinal direction so as to have a predetermined length;
   c) curving the stretched parison by bringing the stretched parison into contact with a curved and heated surface which is formed in a deforming mold, the deforming mold comprising a main body having the curved and heated surface formed therein and a supplementary body which is opened and closed with respect to the main body, a curved space being formed for accommodating the parison when the supplementary and main bodies are closed, the supplementary body being automatically opened and closed when the supplementary body is moved respectively away from and close to a holder for holding the stretched parison, the stretched parison slidingly contacting the curved and heated surface when the holder and the deforming mold are moved close to each other;
   d) setting the curved parison in a cavity inclinedly formed in the blow mold; and
   e) blowing air into the curved parison thereby forming the bottle.

9. A stretch blow molding method according to claim 8, wherein the main body and the supplementary body are pivotably connected to each other, the supplementary body being provided with a handle portion which cooperates with an operating member located on a moving path of the deforming mold for opening and closing the supplementary body.

10. A stretch blow molding method according to claim 8, wherein a plurality of heaters are disposed along the curved and heated surface.

11. A stretch blow molding method according to claim 8, wherein the step of stretching the straight cylindrical parison includes stretching the straight cylindrical parison so as to have such a length that a bottom of the stretched and curved parison contacts an approximately center portion of a bottom of the cavity when the stretched and curved parison is set in the cavity formed in the blow mold.

12. A stretch blow molding method according to claim 8, wherein the step of stretching the straight cylindrical parison includes stretching the straight cylindrical parison unidirectionally by a stretching rod while being heated.

* * * * *